United States Patent [19]
Beutier et al.

[11] 4,446,026
[45] May 1, 1984

[54] PROCESS AND SOLVENT FOR EXTRACTION OF THE CHROMATES PRESENT IN AN AQUEOUS SOLUTION

[75] Inventors: Didier Beutier, Paris; Claude Palvadeau, Breuillet; Gilles Pasquier, Paris; March Dietrich, Auffargis, all of France

[73] Assignee: Krebs & Cie S.A., Paris, France

[21] Appl. No.: 358,053

[22] Filed: Mar. 15, 1982

[30] Foreign Application Priority Data

Mar. 18, 1981 [FR]   France ................................. 81 05413

[51] Int. Cl.$^3$ ............................................. B01D 11/00
[52] U.S. Cl. ..................................... 210/639; 204/95; 204/DIG. 13; 210/913; 423/54
[58] Field of Search .................... 204/DIG. 13, 95; 210/634, 639, 913; 423/54

[56] References Cited

U.S. PATENT DOCUMENTS 3,856,917 12/1974 Texier et al. ........................ 210/634
3,857,919 12/1974 Hazen et al. ........................ 423/54
3,875,285 4/1975 Nyman et al. ...................... 423/54
4,029,734 6/1977 Stauter et al. ...................... 423/54
4,344,924 8/1982 Lucas et al. ........................ 423/54
4,349,514 9/1982 Watanabe et al. .................. 423/54

FOREIGN PATENT DOCUMENTS 51-90999 8/1976 Japan ................................... 423/54

Primary Examiner—Peter A. Hruskoci
Attorney, Agent, or Firm—Lewis H. Eslinger

[57] ABSTRACT

The invention relates to a process and a solvent for extraction of the chromates present in an aqueous solution. According to the invention, the aqueous phase is brought into contact with an organic phase comprising 2 to 10% by volume of a solvent selected from the group of tertiary or quaternary amines and 15 to 40% of a solvent selected from the group of esters of phosphoric acid in a diluent based on petroleum hydrocarbons. The invention is applicable to the production of concentrated solutions of chromates easily recyclable from an extraction of the chromates contained in an industrial solution.

7 Claims, 4 Drawing Figures

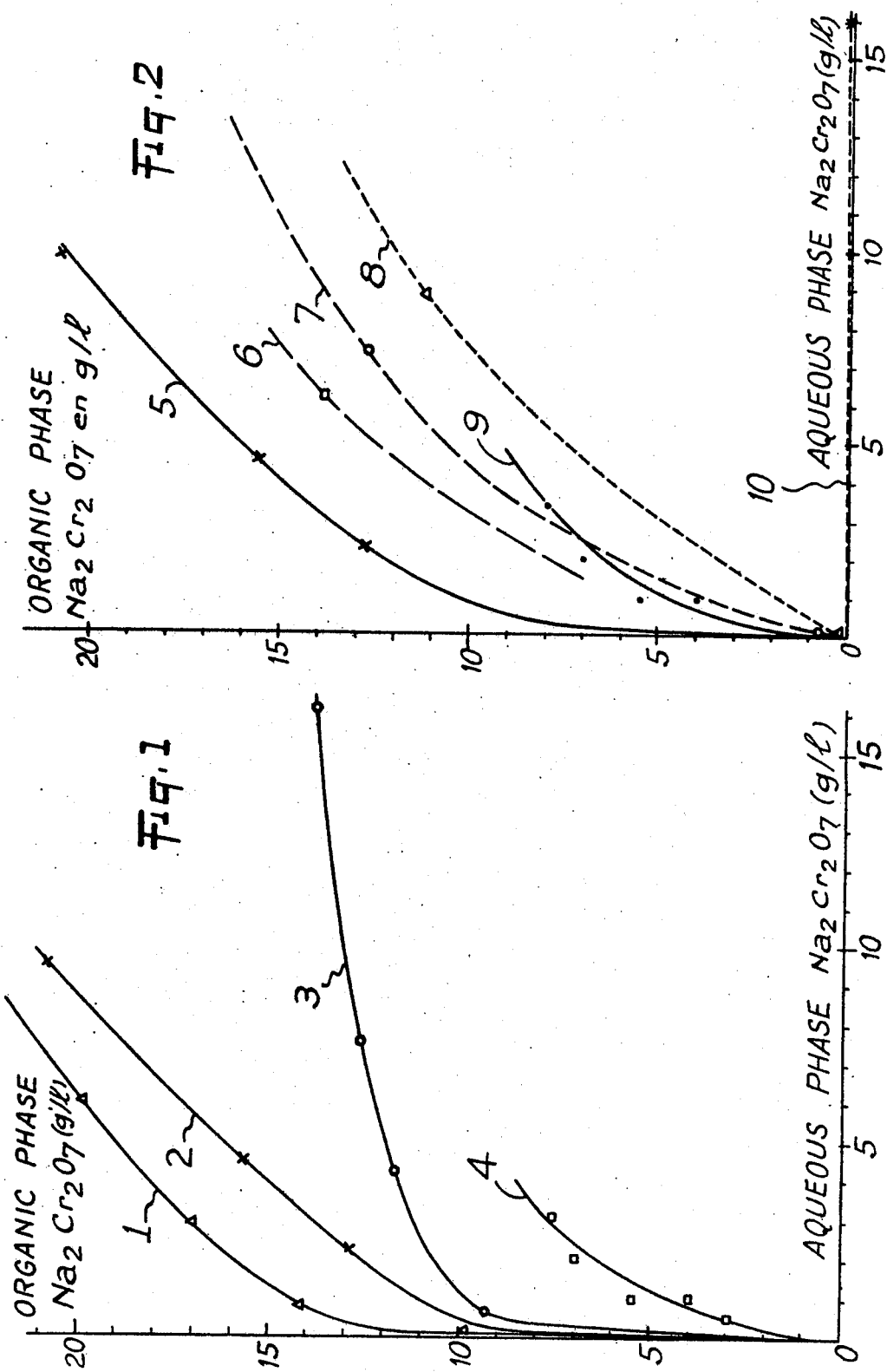

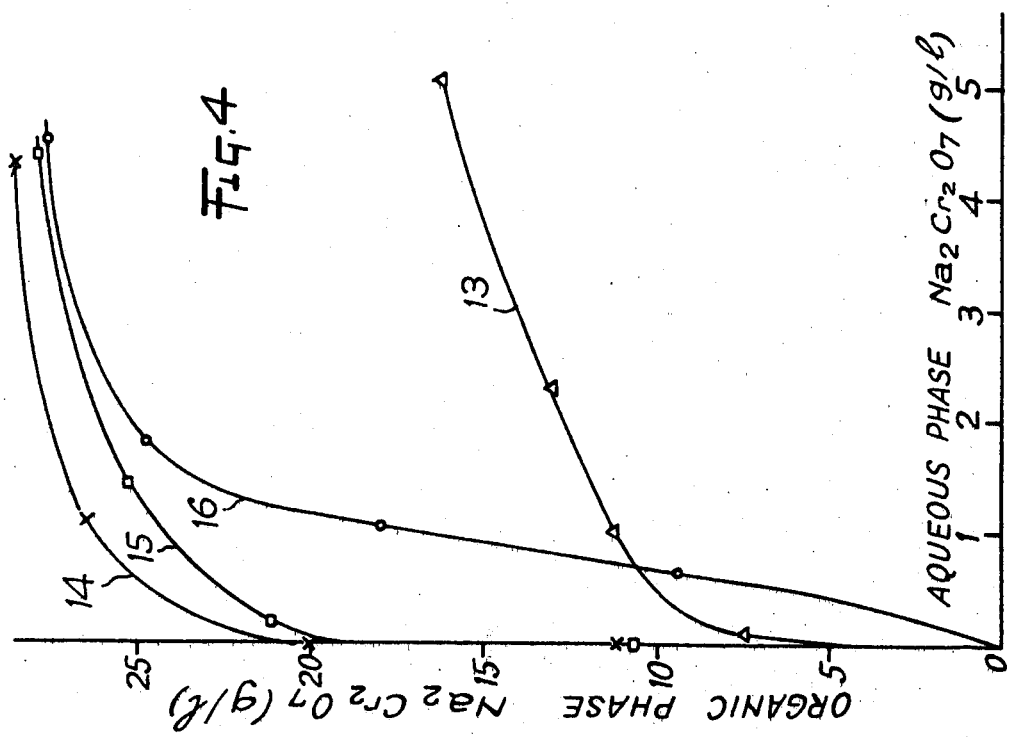
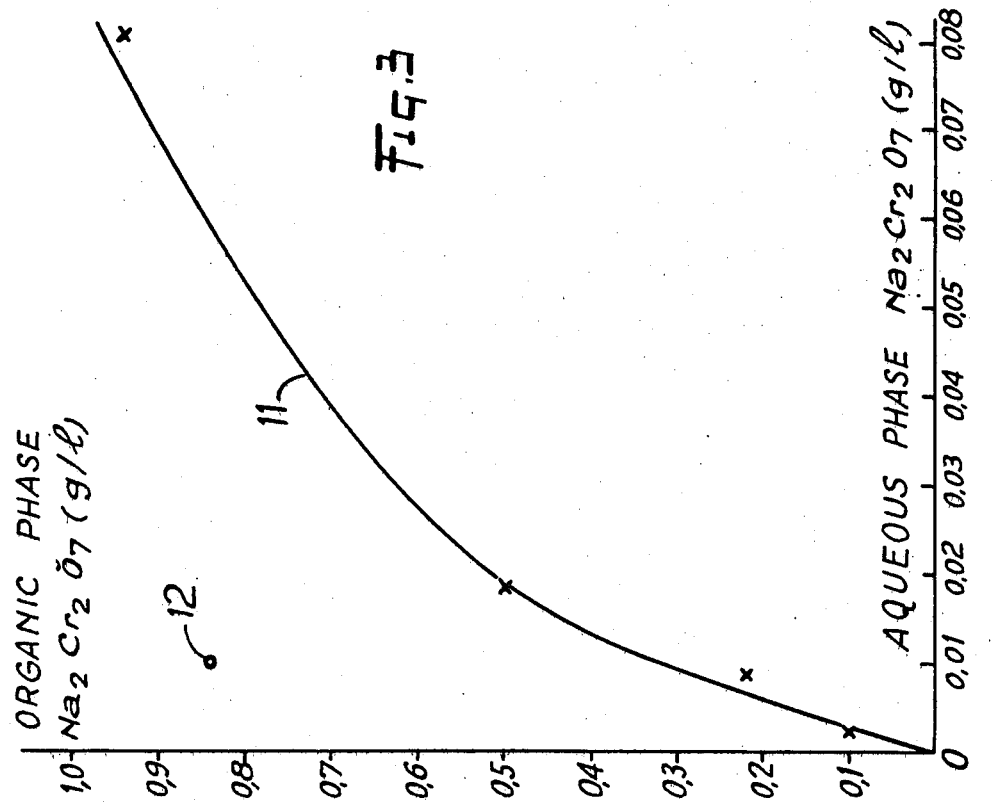

PROCESS AND SOLVENT FOR EXTRACTION OF THE CHROMATES PRESENT IN AN AQUEOUS SOLUTION

The present invention relates to the extraction of chromates from aqueous solutions.

It is known that certain electrolytic treatments of a solution of alkaline salts have an increased faradic yield if a certain quantity of chromates or bichromates is introduced into the solution. The effluent solution then contains an appreciable quantity of bichromate ions (for example 5 g/l on average). There are several reasons for eliminating this chromium. One reason resides in the necessity of complying with certain regulations in force (or future ones) relative to the admissible concentration and quantity of chromium rejected. Another lies in the high economic value of chromium which it is desirable to eliminate from the solution for recovery and recycling purposes.

Among the known processes allowing this extraction, none really gives satisfaction on an industrial scale.

It has been proposed to precipitate the trivalent chromium as hydroxide after reduction of the hexavalent chromium by means for example of sodium sulfide. This solution is opposed to direct recycling of the hexavalent chromium and this operation consumes a large quantity of reagent to be efficient.

Another known process consists in precipitating the chromates by a soluble salt of barium or lead. Now, in numerous cases, the solution treated presents sulfates which also precipitate, the overall solid phase obtained being extremely difficult to filter. Furthermore, these bodies may be detrimental to correct functioning of the process.

It is also known to use an ion exchanger resin of the strongly basic quaternary ammonium type or a mixture of two weakly acid and weakly basic resins. The low capacity of this or these resins to retain the chromates leads to the necessity of using a large volume thereof, which renders its industrial application very expensive and difficult.

Finally, a process is known for liquid-liquid extraction of the chromates present in an aqueous solution, the solvent being constituted by tertiary amines or quaternary ammoniums diluted in a hydrocarbon system (for example kerosine). Particular mention will be made of the products known under the commercial name of "Alamine 336" (produced by the U.S. firm General Mills Chemical Inc.), "Alamine 308" (by the same firm) as tertiary amines, or the products known under the commercial name "Aliquat 336" (of the same firm) or "Adogen 464" (of the firm Ashland Chemical Company). The yield of extraction is considerably influenced by the pH of the aqueous solution. To obtain an extraction of the bichromates greater than 95%, in order to leave only a few traces in the solution treated, operation must be carried out at a pH less than or at the most equal to 1. This degree of acidification presents a number of drawbacks, particularly when the aqueous solution comprises chlorate, as is the case in a solution of chlorides-chlorates issuing from a unit for electrolytic production of chlorates. A release of chlorine dioxide may then be produced, which is a loss of chlorates whilst being extremely noxious and explosive. Moreover, it is necessary to add an alcohol in the organic extraction phase to render the quaternary ammonium or ammoniums miscible in the kerosine. This alcohol is very easily oxidised by the chromates extracted, this causing a rapid degradation of the organic phase and the formation of considerable fouling. The extractor power of the solvent then decreases very rapidly. Consequently, such a solvent can in practice not be laden with bichromates to more than 5 g/l to minimise degradation, which is not a sufficient concentration after washing to allow a direct recycling of the sodium bichromates in the electrolysis unit. It is an object of the present invention to remedy these drawbacks by proposing a process for liquid-liquid extraction of the chromates present in an aqueous solution, which employs a solvent well adapted to the progress of the process on an industrial scale and to the direct recycling of the bichromates extracted.

To this end, the invention relates firstly to a process for extracting the chromates present in an aqueous solution, according to which said solution maintained at a pH lower than 6 is brought in contact with a liquid organic phase, then said chromates are extracted from said organic phase by bringing it into contact with a removal solution containing sodium hydroxide.

According to one of the essential features of the invention, said organic phase comprises by volume 2 to 10% of a solvent selected from the group of the tertiary or quaternary amines and 15 to 40% of a solvent selected from the group of esters of phosphoric acid in a petroleum hydrocarbon system.

In a particular application of the process according to the invention, the above aqueous solution is a solution of chlorides-chlorates issuing from an electrolyzer, whilst the pH is maintained lower than 4 and the final solution laden with chromates is recycled directly towards the electrolyzer.

In addition, the said solvent selected from the esters of phosphoric acid will preferably be tributyl phosphate (TBP) and the one selected from the amine group will be a product known under the commercial name of "Aliquat 336".

It is a second object of the invention to provide the organic phase of extraction of bichromate ions present in an aqueous solution. This organic phase is characteristic in that it comprises, by volume:

2 to 10% and preferably 8 to 10% of product commercially known as "Aliquat 336",
15 to 40% and preferably 20 to 30% of tributyl phosphate (TBP) in a petroleum hydrocarbon system such as kerosine.

The invention will be more readily understood on reading the following description given by way of non-limiting example, which will show the advantages and secondary features thereof. Reference will be made to the accompanying drawings, in which:

FIG. 1 is a graph illustrating, by distribution-extraction curves, the extractor power of different organic phases.

FIG. 2 illustrates by similar curves the extractor power of determined organic phases different from those relative to FIG. 1.

FIG. 3 illustrates, by a distribution-extraction curve, the extractor power of the organic phase according to the invention in the presence of weakly concentrated chromates.

FIG. 4 illustrates by curves similar to the preceding Figures the extractor power of the organic phase according to the invention in the presence of different aqueous solutions.

An embodiment of the process according to the invention will firstly be described, concerning a solution coming from the industrial synthesis of sodium chlorate by electrolysis having the following composition:

$NaClO_3$: 530 g/l; $Na_2Cr_2O_7$: 7 g/l; pH: 6.5;
NaCl: 146 g/l; $Na_2SO_4$: 18 g/l.

The sodium bichromate was recovered in the following manner:

(1) extraction from the solution by an organic phase constituted by 20% TBP, 10% Aliquat 336 and EXSOL D 100 diluent (trade name of a kerosine), in a cascade of four-mixer-settlers in counterflow;

(2) regeneration of the organic phase laden with bichromate by an alkaline solution comprising hydroxide (2.5 N) and sodium chloride (150 g/l) in a cascade of five mixer-settlers in counterflow;

(3) washing of the regenerated solvent by a solution of NaCl in a mixer-settler.

The temperature was about 35° C. at extraction and about 55° C. at re-extraction.

The rates of flow were maintained respectively at about 15 l/hr for the initial solution, about 8 l/hr for the organic phase and about 0.8 l/hr for the alkaline solution.

In the four mixers serving for extraction of the bichromate, the pH of the aqueous solution was maintained at 3.0±0.5 by the addition of hydrochloric acid in six times molar solution.

The operation was continued long enough to treat 786 l of chlorate solution. The following solutions were finally obtained:

| purified solution of chlorate | 786 l |
| --- | --- |
| $Na_2Cr_2O_7$ | 10 mg/l |
| pH | 3 |
| solution of concentrated chromate | 16.8 l |
| $Na_2Cr_2O_7$ | 204 g/l |
| pH | 11.5 |
| washing solution | 72.7 l |
| $Na_2Cr_2O_7$ | 22.7 g/l |

The total volume of acid consumed was 12.8 l.

Just before the operation was stopped, samples for analysis were taken from the two extraction phases. The following concentrations were measured (expressed in g/l of $Na_2Cr_2O_7$).

| Mixer-settlers | Aqueous phase | Organic phase | pH of the aqueous phase |
| --- | --- | --- | --- |
| 1 | 0.012 | 0.44 | 2.5 |
| 2 | 0.088 | 1.92 | 3.0 |
| 3 | 0.95 | 9.4 | 2.5 |
| 4 | 6.9 | 9.4 | 3.4 |

The above example illustrates one of the main advantages of the invention, namely the use of the process on an industrial scale. This advantage is particularly interesting when the invention is carried out at the outlet of a unit for production of chlorates by electrolysis; the content of bichromates of the washing solution is sufficient for a direct recycling of this solution to be effected in the brine to be electrolyzed.

FIG. 1 shows on the abscissae the concentrations in grams per liter of $Na_2Cr_2O_7$ in the aqueous phase and on the ordinates the same concentrations in the organic phase. The aqueous phase is a solution of sodium chlorate at 550 g/l and of sodium chloride at 100 g/l. The pH of this solution is 3.

Curve 1 illustrates, by a distribution-extraction curve, the extractor power of an organic phase comprising 10% "Aliquat 336" and 30% TBP by volume in a kerosine with regard to the chromium contained in said aqueous solution. Curve 2 is the illustration of the extractor power for an organic solvent comprising only 20% TBP with 10% "Aliquat 336". Curve 3 relates to a solvent containing 5% of "Aliquat 336" and 20% TBP. Finally, curve 4 represents the power of extraction of a solvent containing 10% "Aliquat 336" and 5% decanol.

This Figure clearly shows, on the one hand, the influence of the relative concentrations of the "Aliquat 336" and of the TBP on the extractor power of the solvent and, on the other hand, the existence of an unexpected synergetic effect of the TBP-"Aliquat 336" mixture with respect to the decanol-"Aliquat 336" mixture. It has also been observed that the mixture, object of curve 1, presents a considerably increased resistance to oxidation and may be maintained laden with chromates for several months without deteriorating. In addition, these performances are substantially constant over a broad range of temperatures (20° to 60° C.). Finally, said mixture may easily be regenerated by an alkaline solution.

Curves 5 to 8 of FIG. 2 illustrate the extractor power of a solvent comprising 10% of tertiary or quaternary amines and 20% of TBP with respect to the chromium contained in an aqueous solution identical to the one previously defined and under the same pH conditions.

Curve 5 is identical to curve 2 of FIG. 1 as it concerns the same solvent. Curve 6 is relative to a solvent in which the amine is a tertiary amine (triiso-octylamine: TiOA). Curve 7 represents a solvent with 10% of another tertiary amine known under the commercial name of "Alamine 336" by its manufacturer, the American firm General Mills Chemicals Inc. Curve 8 concerns a solvent comprising a secondary amine (10% by volume) named $LA_1$ by the manufacturer, the American firm Rohm & Haas Co.

Curve 9 is to be compared with curve 4 of FIG. 1, since it concerns the same organic phase and curve 10 illustrates the extractor power of a solvent containing only 30% of TBP in a petroleum hydrocarbon system.

This Figure clearly shows that one of the best solvents is the one represented by curve 5 and confirms the synergetic effect of the components of said solvent.

Curve 11 of FIG. 3 shows the extractor power of the solvent (10% "Aliquat 336", 20% TBP) with respect to an aqueous solution identical to the one already mentioned, in which the chromium is strongly diluted. The pH is at the value 3.3. Point 12 illustrates the result of a measurement made at pH 3. This Figure illustrates another advantage of the solvent according to the invention, namely its efficiency in extracting chromium in the form of traces, such efficiency being the greater as the pH is lower. However, it should be noted that 3 in pH value is not a prohibitive degree of acidification for the industrial application of the process according to the invention to a solution of chlorates.

Finally, FIG. 4 repeats curves 2 and 5 above by curve 13. Curves 14, 15 and 16 concern the same solvent (10% of "Aliquat 336" and 20% TBP) in the presence of an aqueous solution containing, apart from the chromates, only sodium chloride concentrated at 250 g/l. Curve 14 has been plotted at pH 2, curve 15 at pH 3 and curve 16 at pH 5.5. This Figure illustrates one of the advantages of the process according to the invention making it possible, with the solvent mentioned above, to proceed with the treatment of aqueous solutions laden with chromium at relatively high pH values.

Finally, it will be noted that, although the above description and examples which it contains mention only a phosphoric ester—TBP—, it would not depart from the scope of the invention to envisage using, in the same proportions and associations, another ester such as for example trioctyl phosphate or trioctylphosphine oxide, even if these bodies may present less stability in time, the organic phase being laden with chromates or bichromates.

The invention finds advantageous application in the domain of extraction and recovery of the chromium contained in an effluent aqueous solution coming from a unit of chemical production, particularly with a view to recycling thereof.

What is claimed is:

1. Process for extracting chromates present in an aqueous chlorides-chlorates brine solution comprising the steps of maintaining said solution at a pH lower than 6, bringing said solution into sufficient contact with a liquid organic phase to extract chromates into the organic phase in which the organic phase consists essentially of by volume a mixture of 2 to 10% of a solvent selected from the group of tertiary and quaternary amines and 15 to 40% of a solvent selected from the group of esters of phosphoric acid in a petroleum hydrocarbon system, and extracting said chromates from said organic phase by bringing it into contact with a alkaline removal solution.

2. The process of claim 1, wherein the pH is maintained lower than 4.

3. The process of claim 2, further comprising the steps of obtaining the aqueous brine solution from the outlet of an electrolysis unit used in the production of chlorates, and directly recycling said chromates to the inlet of said electrolysis unit.

4. The process of claim 1, wherein the said solvent selected from the group of esters of phosphoric acid is tributyl phosphate (TBP).

5. The process of claim 4, wherein the organic phase comprises 8 to 10% by volume of the amine group.

6. The process of claim 5, wherein the organic phase comprises 20 to 30% of tributyl phosphate (TBP) in a petroleum hydrocarbon system.

7. The process of claim 1, wherein the removal solution contains sodium hydroxide.

* * * * *